Figure 1:
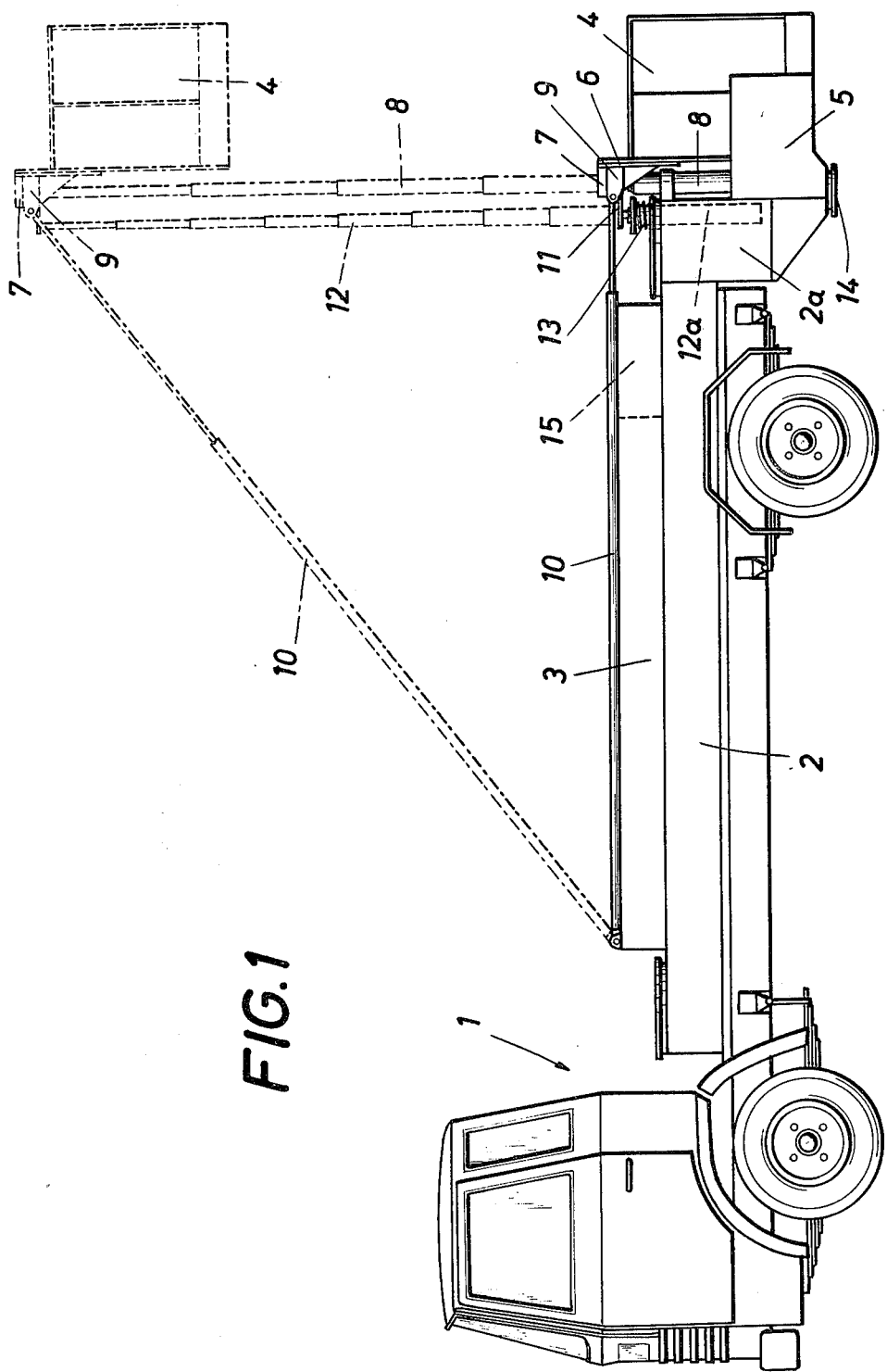

# United States Patent [19]

Zellinger et al.

[11] 4,424,828
[45] Jan. 10, 1984

[54] VEHICLE FOR SERVICING AIRCRAFT

[76] Inventors: Hans Zellinger, Rosenau 16, A-4271 St. Oswald/Freistadt; Fritz Zellinger, Gschwand 279, A-4810 Gmunden, both of Austria

[21] Appl. No.: 331,157

[22] Filed: Dec. 16, 1981

[30] Foreign Application Priority Data

Dec. 24, 1980 [AT] Austria .................................. 6311/80

[51] Int. Cl.³ .............................................. F17D 1/00
[52] U.S. Cl. ..................... 137/342; 137/351; 182/63; 187/9 E; 15/340; 15/312 R; 414/508; 244/137 R
[58] Field of Search ............... 137/899, 342, 354, 351, 137/590; 182/63, 148, 141, 51; 244/137 R; 187/9 E, 9 R; 15/340, 312 R; 414/508

[56] References Cited

U.S. PATENT DOCUMENTS

| | | | |
|---|---|---|---|
| 2,514,230 | 7/1950 | Feazel | 137/351 |
| 3,243,123 | 3/1966 | Inghram et al. | 182/51 |
| 3,666,046 | 5/1972 | Meinecke, Jr. | 182/63 |
| 3,871,399 | 3/1975 | Watson | 137/899 |
| 4,088,200 | 5/1978 | Cowley et al. | 182/63 |

Primary Examiner—Martin P. Schwadron
Assistant Examiner—Sheri M. Novack
Attorney, Agent, or Firm—Kurt Kelman

[57] ABSTRACT

A vehicle for use in the servicing of aircraft, particularly in the removal of feces from toilets of passanger aircraft, comprises a chassis and a body which is mounted on said chassis and has only a small height so that the vehicle can be moved under aircraft portions having only a small ground clearance. A cage comprising a working platform is mounted on the vehicle near its rear end and by means of an upright hydraulic cylinder having a telescopic piston is adapted to be raised from a position of rest, in which the cage is flush with the top of the body. To permit the use of a telescopic piston having large length sections, the hydraulic cylinder extends at least through a major portion of the height of the body. The working platform is disposed on the rear of the hydraulic cylinder. The eccentric load which is exerted by the raised cage on the telescopic piston is compensated at least in part by a spring, which is connected at one end to the top end portion of the telescopic piston and at its other end to the body of the vehicle near the front end of said body. The cage is moved in a vertical direction by said telescopic piston. The latter can also be used to extend and retract a telescopic tube, which communicates with the interior of said tank.

17 Claims, 2 Drawing Figures

VEHICLE FOR SERVICING AIRCRAFT

This invention relates to a vehicle for use in the servicing of aircraft, particularly in the removal of feces from toilets of passanger aircraft, comprising a chassis and a body, the top of which extends less than 2 meters, particularly less than 1.60 meters, above the ground, and comprises a working platform and is adapted to assume a position of rest, in which the top of said cage is substantially flush with the top of said body, a hydraulic cylinder-piston unit operable to raise said cage from said position of rest, and a conduit, which communicates with the interior of said tank and has a top end which is adapted to be raised and disposed within reach of the hands of a person standing on said working platform.

Such vehicles may be used to remove feces from the toilets of aircraft, to supply drinking water to aircraft or to perform minor service operations at aircraft. When the cage has been retracted, the vehicle must have only a small height above the ground so that the rear end of the vehicle with the cage can be moved below aircraft portions which have only a small ground clearance. The top of the body of the vehicle may be strong enough to withstand foot traffic and may be used as a working platform for persons performing service operations. As has been mentioned above, the body of the vehicle may have to be moved under aircraft portions which have only a small ground clearance. Such portions may be the fuselage, the wings or the elevator. The fittings for receiving fluids to be supplied and for discharging waste fluids may be provided on the aircraft at different locations and in different elevations so that the cage may have to be raised by the hydraulic cylinder-piston unit to an elevation of 4 meters above the ground so as to render aircraft portions spaced, e.g., 6 meters above the ground accessible to a person standing on the working platform. In a known vehicle which is of the same kind and has been developed by the present inventors, the cage is carried at the free end of a boom, which is adapted to be pivotally raised and lowered by a hydraulic cylinder-piston unit on an axis disposed closely behind the driver's cab, and a parallel-motion linkage is provided, which ensures that the working platform will be level in any raised position. In position of rest, the boom extends longitudinally beside the remaining parts of the body of the vehicle. For this reason it may be necessary to set back one tank on the side of the vehicle on which the boom is disposed. The cage is raised along an arc of a circle. That vehicle has the disadvantage that its structure is expensive, that a large space is required for the boom, the means for driving the boom, and the cage, and above all, that the cage moving along an arc of a circle will be shifted along the vehicle. This renders the maneuvering of the cage to a fitting of the aircraft more difficult and often necessitates a re-adjustment of the cage. The conduits connected to the tanks for fluids to be supplied or for waste fluids to be received must be flexible from the associated tank and an operator standing on the working platform must hold the free end of such conduit until it has been connected to the proper fitting of the aircraft. A considerable effort of the operator will be required to hold that free end if the hose is large in cross-section.

It is an object of the invention to simplify the structure of a vehicle of the kind described first hereinbefore and to improve the maneuverability, simplify the operation and increase the field of application of the vehicle.

This object is accomplished in accordance with the invention in that the hydraulic cylinder-piston unit is vertical and comprises a telescopic piston, the cage is disposed on the rear of the hydraulic cylinder-piston unit, and a spring is provided, which is connected at one and to the top end portion of the telescopic piston and another end secured to the body of the vehicle near the forward end thereof and serves to compensate at least in part the eccentric load exerted by the cage on the telescopic piston.

The hydraulic cylinder-piston unit comprising a telescopic piston requires only a small space. Because the cage is disposed on the rear of the hydraulic cylinder-piston unit, the overall height of the body of the vehicle at the rear thereof can be used to accommodate the hydraulic cylinder-piston unit when the piston has been retracted. The telescopic piston must have at least two length sections and in most cases three or more length sections. If the spring were not provided, substantial overlaps of the several length sections of the telescopic piston would be required to ensure the required stability and to avoid a strong resistance to the movement of the piston, which resistance would be due to the weight of the cage and the person or persons standing on the working platform. Because the spring is provided, small overlaps between the length sections of the telescopic piston are sufficient. By a spring having a progressive spring characteristic, the eccentric load which is exerted by the cage on the telescopic piston can be substantially compensated at least when the telescopic piston has been fully extended so that additional means for constraining the cage will not be required. The spring can be accommodated within a small space and can be retracted into a longitudinal recess provided in the top of the body of the vehicle, e.g., in the top of one or more tanks.

To ensure that a larger portion of the aircraft will be accessible to a person standing on the working platform and that minor errors in the maneuvering of the vehicle under the desired fitting can be compensated, the cage is mounted by means of bearing permitting a limited pivotal movement of the cage about the longitudinal axis of the telescopic piston.

An exact maneuvering will be greatly facilitated by the fact that the cage is moved along a straight line rather than along an arc of a circle by the telescopic piston.

The spring is designed to act in its longitudinal direction and is accommodated in a telescopic tube, which is secured at one end to the body of the vehicle and at the other end to the top end of the telescopic piston. The spring may be a tension spring or a compression spring for instance, a pneumatic spring. The resistance of the extended system to buckling in the lateral direction of the vehicle will be improved if the telescopic tube is connected at its ends to rigid pivots. The cage is preferably mounted at the rear of the vehicle near the center of the width of the vehicle. In that case the cage can be maneuvered more easily under a desired point of the vehicle than a laterally offset cage.

The special means provided for moving and constraining the cage permit the provision of a telescopic tube which extends parallel to the hydraulic cylinder-piston unit and is adapted to be extended and retracted with the telescopic piston and which constitutes a part of the conduit connected to the tank and is provided at its top and with a conduit connector, such as a flexible conduit member or a funnel. The telescopic tube is operated by the hydraulic cylinder-piston unit. The operator must manipulate only the conduit connector.

The above-mentioned conduit may be connected to the tank at a rear end portion of the tank, which rear end portion is downwardly extended and has a bottom fitting for receiving a fluid to be supplied or for discharging a waste field. Said rear end portion is disposed behind the rear axis of the vehicle and increases the volumetric capacity of the tank. A decisive advantage afforded by that arrangement resides in that heavy feces removed from toilets will accumulate in said downwardly extended rear end portion and will be discharged first through the bottom fitting and the downwardly extended end portion and its bottom fitting will subsequently be flushed by the liquid from the remaining portion of the tank.

To permit the telescopic tube to be assembled from tubular sections which are as long as possible, the tank may be adapted to accommodate at least part of the telescopic tube when the latter has been retracted. To ensure that said portion of the telescopic tube which is accommodated in the tank will be removed from the tank when the telescopic tube is even slightly extended, a spring may be provided, which biases the telescopic tube so as to move it out of the tank.

It is often necessary to rinse and disinfect waste water tanks of an aircraft. A vehicle used for this purpose is provided with a rinse water tank. A disinfectant solution is prepared in that a certain proportion of disinfectant is added to the rinse water. To permit this to be accomplished without need for additional manipulations whenever this operation is to be performed, the vehicle carries a container for a liquid disinfectant and a proportioning device by which the container for disinfactant is connected to the rinse water tank or a rinse water conduit.

Figure 2:
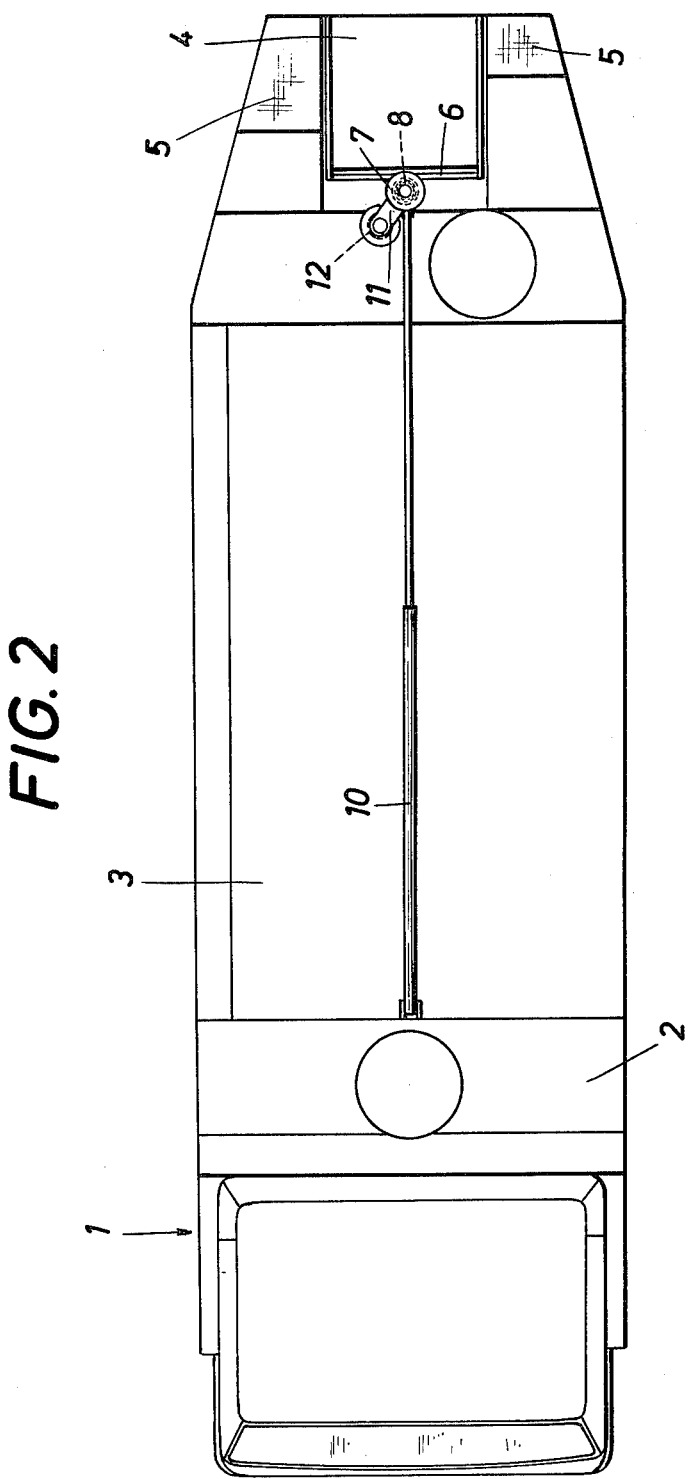

An embodiment of the invention is shown by way of example on the drawings, in which FIG. 1 is a diagrammatic side elevation showing a vehicle which embodies the invention and FIG. 2 is a top plan view showing the vehicle of FIG. 1.

A truck 1 comprises a body which consists of two or three tanks 2, 3 and 15, which are of small height. The tanks 3 and 15 are disposed one behind the other on the tank 2. These tanks may be used to hold feces to be disposed of or rinse water or a disinfectant to be supplied to aircraft. The tank 15 contains disinfectant in a quantity which is sufficient for more than one filling of the rinse water tank 3 and is connected by a proportioning device to the tank 3 or to a conduit for supplying rinse water to or from receiving rinse water from an aircraft, so that a predetermined proportion of disinfectant will be added to the rinse water.

A cage 4 comprising a working platform and a fence is mounted on the vehicle near its rear end and is shown in solid lines in FIGS. 1 and 2 in a position of rest, in which the cage is disposed between two steps 5 and 6 releasably locked in position. The cage 4 is carried by a vertical bracket 6, which is rigidly connected to a bearing body 7, which is rotatably mounted on the top end of a vertical telescopic piston 8. For this purpose the telescopic piston 8 is provided at its top end with a collar 9, which supports the bearing body 7. The telescopic piston 8 is adapted to be extended by a vertical hydraulic cylinder, which is mounted on the vehicle in front of the cage. A telescopic tube 10 is pivoted at one end to the collar 9 on a horizontal axis and at the other end to the top of the tank 3, also on a horizontal axis. The tank 3 may be formed at its top with a longitudinal recess, which is adapted to receive the tube 10. The tube 10 accommodates a compression spring, which has a progressive characteristic and tends to retract the telescopic tube 10 to its shortest length.

In FIG. 1 it is indicated in phantom that the telescopic piston 8 consists of a plurality of length sections which can only be extended by the application of pressure fluid and are biased in a retracting sense by the weight of the cage 4. Another telescopic tube 12 is provided, which is parallel to the telescopic piston 8 and connected to the collar 9 by a transverse strap 11. The telescopic tube 12 has a portion 12a which will be accommodated in a downwardly extended rear end portion 2a of the tank 2 when the cage 4 is in position of rest. As the telescopic piston 8 is extended, a spring 13 will raise the end portion 12a of the tube 12 out of the end portion 2a. The tube 12 will subsequently be raised with the collar 9 as the piston 8 is extended so that the top end of the tube 12 will be about on the same level as top of the cage 4. The tube 12 may be connected at its top end to a flexible conduit connector or to a conduit connector which is provided with a funnel and that conduit connector can be manipulated by an operator standing on the working platform. In the embodiment shown by way of example the tube 12 is used to remove feces from aircraft toilets. The fitting 14 for discharging feces from the tank 2 is provided at the bottom of the end portion 2a, in which the heavy constituents of the feces can be expected to accumulate.

What is claimed is:

1. In a vehicle for use in the servicing of aircraft, comprising:

a chassis, a body comprising a tank having a top spaced less than 2 meters above the ground, a cage comprising a working platform and disposed on the rear of said body and adapted to assume a position of rest in which the top of said cage is substantially flush with the top of said body, said cage being adapted to be raised from said position of rest, a hydraulic cylinder-piston unit carried by said chassis and operable to raise said cage from said position of rest, and a conduit, which communicates with the interior of said tank and has an upper and which is adapted to be raised and is disposed within reach of the hands of a person standing on said platform, the improvement residing in that said cylinder-piston unit is vertical and disposed in front of said cage and comprises a telescopic piston, which is connected at its top end portion to said cage and is adapted to be upwardly extended, and a spring is provided, which is connected at one end to the top end portion of said piston and at another end to said body near the forward end thereof and is arranged to counteract the eccentric load applied to said cylinder-piston unit by said cage when said piston is extended.

2. The improvement set forth in claim 1, as applied to a vehicle adapted to be used to remove feces from aircraft toilets.

3. The improvement set forth in claim 1, as applied to a vehicle wherein
said body comprises more than one of said tanks and
a plurality of said conduits are provided, each of which communicates with the interior of one of said tanks.

4. The improvement set forth in claim 1, as applied to a vehicle wherein the top of said body is disposed less than 1.60 meters above the ground.

5. The improvement set forth in claim 1, as applied to a vehicle wherein said conduit is flexible in part.

6. The improvement set forth in claim 1, wherein said cage is pivoted to the top end portion of said piston by a bearing permitting a limited angular movement of said cage about the axis of said piston.

7. The improvement set forth in claim 1, wherein
said tank is formed with a recess extending in the longitudinal direction of said vehicle and
said spring is arranged to be accommodated at least in part in said recess when said cage is in said position of rest.

8. The improvement set forth in claim 1, wherein
said spring is adapted to exert a force in its longitudinal direction and
a telescopic tube is provided, which is connected at one end to the top end portion of said piston and at another end to said body and accommodate said spring.

9. The improvement set forth in claim 1, wherein said spring is a pneumatic spring and is pivoted at respective ends to said top end portion of said piston and to said body.

10. The improvement set forth in claim 1, wherein
said conduit comprises a telescopic tube, which communicates with the interior of said tank and extends parallel to said cylinder piston unit, and
the top end portion of said telescopic tube is connected to the top end portion of said piston and adapted to be extended and retracted by said piston.

11. The improvement set forth in claim 10, wherein said telescopic tube is provided at its top end with means for releasably connecting a conduit connector to said telescopic tube.

12. The improvement set forth in claim 1, wherein
said tank for a rear end portion having a bottom which extends below the bottom of the remaining portion of said tank and is provided with a fitting and
said conduit is connected to said tank at said rear end portion.

13. The improvement set forth in claim 10, wherein said telescopic tube is adapted to be retracted to a position in which it extends into said tank.

14. The improvement set forth in claim 13, wherein a spring is provided, which tends to move said telescopic tube out of said tank.

15. The improvement set forth in claim 1, wherein
said tank is adapted to hold rinse water,
said vehicle carries a receptable adapted to hold a liquid disinfectant, and
a proportioning device is connected between said receptacle and said tank and operable to add liquid disinfectant to said rinse water in said tank in a predetermining proportion.

16. The improvement set forth in claim 1, wherein
said tank is adapted to hold rinse water,
said conduit is adapted to conduct rinse water from said tank to an aircraft,
said vehicle carries a receptacle adapted to hold a liquid disinfectant, and
a proportioning device is connected between said receptacle and said conduit and operable to add liquid disinfectant to said rinse water flowing in said conduit in a predetermined proportion.

17. The improvement set forth in claim 1, wherein said cylinder-piston unit comprises a cylinder the top end of which is substantially flush with the top of said body.

* * * * *